March 6, 1951 R. F. YONASH 2,544,409

AUTOMATIC RADIO PROGRAM SELECTOR SYSTEM

Filed April 12, 1947 4 Sheets-Sheet 1

INVENTOR.
Robert F. Yonash

BY

ATTORNEY

March 6, 1951 R. F. YONASH 2,544,409

AUTOMATIC RADIO PROGRAM SELECTOR SYSTEM

Filed April 12, 1947 4 Sheets-Sheet 2

INVENTOR.
Robert F. Yonash

BY

ATTORNEY

March 6, 1951 R. F. YONASH 2,544,409

AUTOMATIC RADIO PROGRAM SELECTOR SYSTEM

Filed April 12, 1947 4 Sheets-Sheet 3

INVENTOR.
Robert F. Yonash
BY
ATTORNEY

March 6, 1951 R. F. YONASH 2,544,409

AUTOMATIC RADIO PROGRAM SELECTOR SYSTEM

Filed April 12, 1947 4 Sheets-Sheet 4

INVENTOR.
Robert F. Yonash
BY
ATTORNEY

Patented Mar. 6, 1951

2,544,409

UNITED STATES PATENT OFFICE 2,544,409

AUTOMATIC RADIO PROGRAM SELECTOR SYSTEM

Robert F. Yonash, Dallas, Tex.

Application April 12, 1947, Serial No. 741,123

6 Claims. (Cl. 161—1)

This invention relates to automatic station selection systems for radio receiving sets.

The principal object of the invention is to provide a program selecting system for radio receivers which is manually set and electrically energized to automatically bring in preselected programs until manually reset. Chief among the outstanding characteristics of the invention is the fact that the chassis is circular in shape, which makes for compactness and symmetry of design but most important, the circular design of the housing is peculiarly appropriate to encase the elements of the invention, consisting primarily of a mounting carrying a circular series of station selector posts, each supporting vertically adjustable clips and which posts are brought successively into juxtaposition with a common radio circuit energizing column at intervals predetermined by a clock mechanism operating the mounting for said posts. By virtue of vertically spaced spring contacts selectively depressed by said clips and a spiral series of lobular protuberances arranged on said column which are brought successively into engagement with the depressed contacts, the particular circuit or circuits prepared by any or all of the clips to close are energized thereby, resulting in the bringing in of the selected program or programs.

Another object of the invention is to provide an automatic program selecting system which will not only continue with precision to bring in preselected radio and television programs in proper sequence but also to provide means for instantly suspending the automatic feature of the system, restoring the radio set to its conventional finger or manual control, such as in cases where special programs not in continuity, may be heard. With equal facility, automatic control may be resumed.

With the foregoing and other objects in view, the invention has further reference to certain features of accomplishment which will become apparent as the description proceeds, taken in connection with the accompanying drawings wherein.

Figures 1, 2, 4, 5:
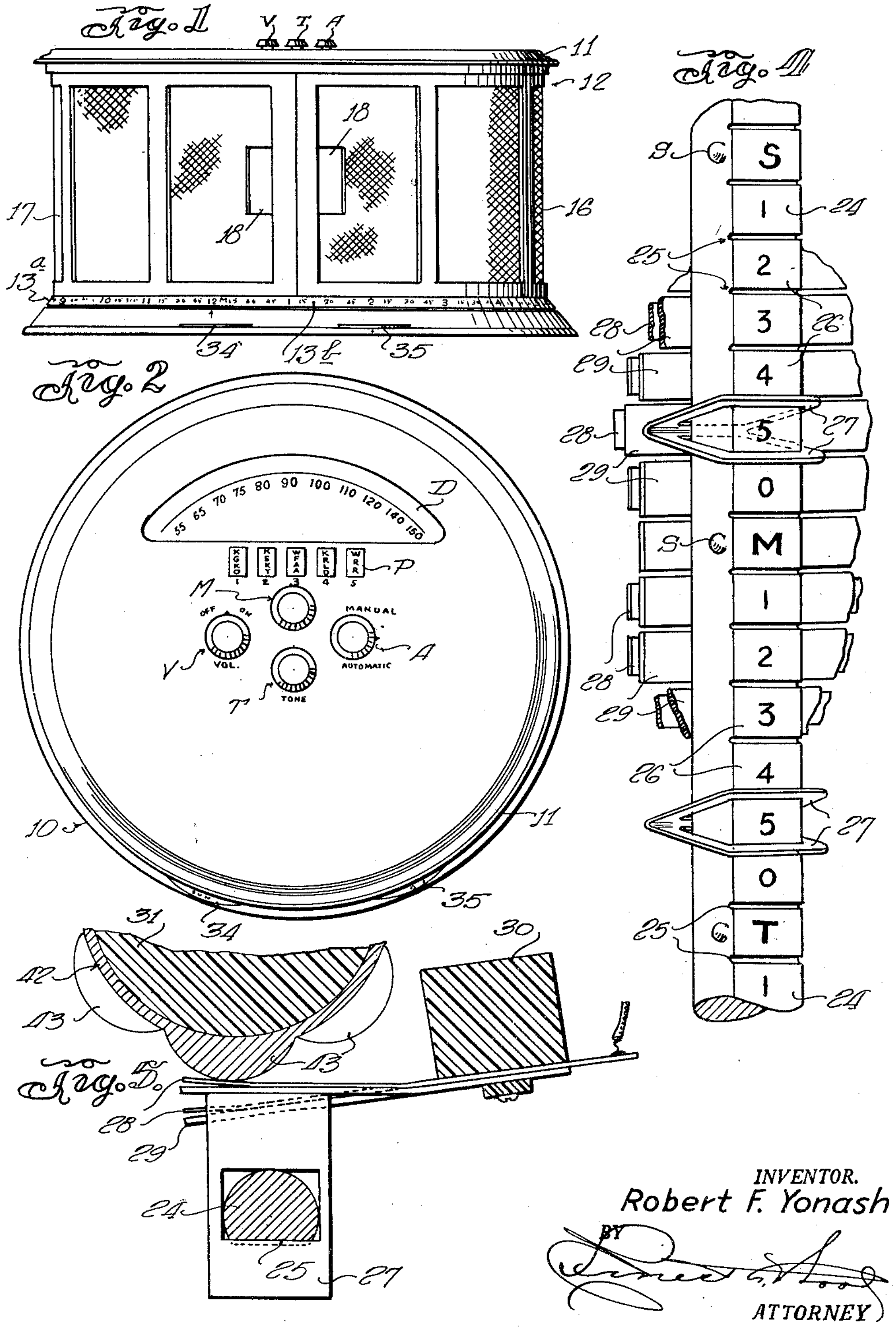
Figure 1 is a front elevational view of a cabinet of the preferred design adapted to house the elements of the invention and a radio receiving set.
Figure 2 is a top plan view thereof.
Figure 4 is a fragmentary perspective view of one of the station selector posts showing thereon the clips and adjacent spring contacts.
Figure 5 is a fragmentary plan view, partly in transverse section, showing one of the selector posts; the radio circuit energizing column and a clip positioned to dispose a spring contact in operative relation to the column.
Figure 3:
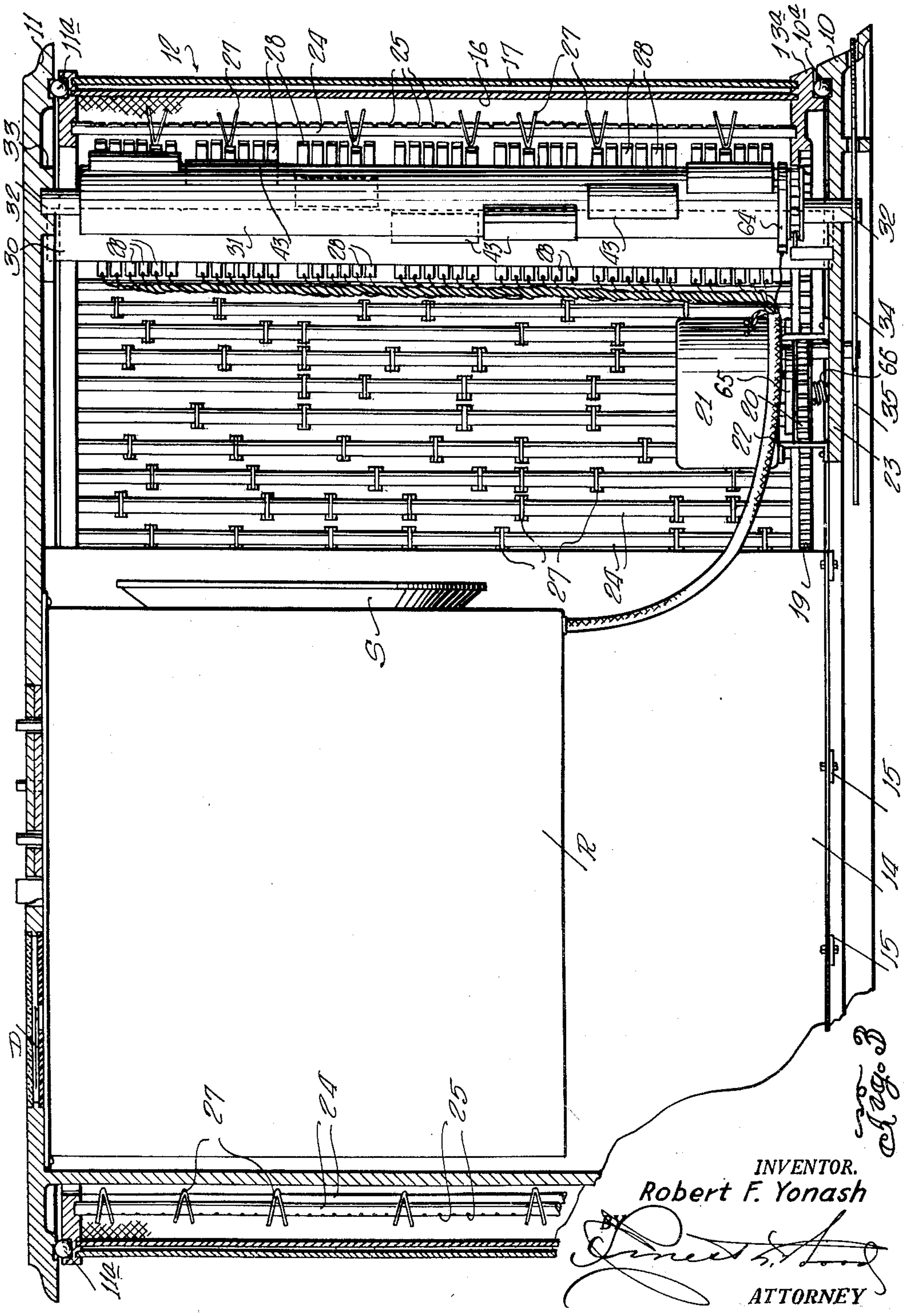
Figure 3 is a side view in vertical section and on an enlarged scale, taken on line 3—3 on Figure 6.

Continuing with a more detailed description of the drawings, reference is primarily made to Figure 1 wherein is shown a cabinet which is circular in form, preferably so because of the peculiar characteristics of the invention and which cabinet has a circular base 10. Between a correspondingly shaped top 11 and the base 10 is the cylindrical wall, broadly designated as 12 but which will be more specifically described presently. Supported by the wall 12 and supporting the top 11 is an annular flange 13 having an annular groove therein containing balls 11a which latter actually support the top 11. Similarly, an annular member 13a is supported on balls 10a, the latter operating in an annular channel in the base 10. In Figure 3, it will be observed that the base 10 and top 11 are fixedly joined together by means of an arcuate plate 14 having ears 15 both at the top and bottom by which the plate is secured to the base 10 and top 11 of the cabinet. It is apparent therefore that the intermediate section, that is, the wall 12 may revolve independently of the top and base of the cabinet which is a feature of importance in the assembly and one which makes possible the outstanding simplicity in performance of the invention.

The wall 12 is made up of two semi-circular reticulated panels 16 and 17 whose front ends have recesses 18 serving as handles by which the panels are slid to open and closed positions, the rear ends slidably overlapping when opened to gain access to the elements, to be presently described, for setting the radio for automatic selection of programs. The top and bottom edges of the panels 16 and 17 slide in relatively spaced, annular grooves in the flanges 13 and 13a respectively.

The lowermost flange 13a has an internal ring gear 19 formed on its inner edge and which is indirectly operated, in a manner to be hereinafter explained, by a gear 20, mounted on the center shaft of an electric clock 21. The clock 21 is supported by brackets 22 which, in turn, are mounted on a platform 23 extending inwardly from the base 10. It is intended that the ring gear 19 shall make one revolution each twenty-four hours.

Supported at their upper and lower ends by the flanges 13 and 13a respectively is a series of ninety-six vertical posts 24 arranged in a circle inwardly of the wall 12. In Figures 4 and 5, it will be seen that these posts are substantially half-round in transverse section to present a flattened face which is divided into sections by transverse grooves 25. In selected ones of the panels 26 defined by the transverse grooves 25 in the posts 24 are the letters S, M, T, W, T, F, and S arranged in a downwardly direction to designate the days of the week. Between each day designation, the panels 26 bear numerals 1, 2, 3, 4, and 5, designating radio broadcasting stations, and "O" the off position.

Mounted on each of the ninety-six posts 24 is a series of seven spring clips 27, each one of which is adjustable manually on its post vertically throughout the range of six of the panels defined by the transverse grooves 25 which latter insure against displacement of the clips from adjusted positions. Stops S are provided on the posts 24 to limit vertical displacement of the clips within a predetermined range.

The purpose of the clips 27 is to selectively depress spring contacts 28 through conforming non-metallic strips 29 which insulate the clips from the contacts 28. The contacts 28 and their insulating strips 29 are equal in number to the number of station panels on the posts so that wherever a clip is set on a post, it will depress the desired contact. This is borne out in Figures 4 and 5. The contacts and insulating strips are mounted in vertically spaced relationship on a terminal post 30, Figures 3, 5 and 6, in close parallelism with a circuit energizing column 31.

The circuit energizing column 31 has a spindle 32 on each end, the upper spindle being journaled in a boss 33 formed on the underside of the top 11 while the spindle on the lower end of the column is journaled in the platform 23, provided on the base 10 and extending through said platform the spindle 32 has mounted thereon a disc 34 having imprinted adjacent its perimeter, the days of the week. Since the disc 34 is mounted on and operated by the column 31, it operates in unison with the column, thereby completing one cycle each seven days. The letters on the disc which indicate the days of the week, appear consecutively on the exposed area of the disc, at the front of the cabinet, as shown in Figure 2.

Adjacent to and on the same plane with the calendar dial 34 is a minute dial 35, which is mounted on the shaft of a pinion 36 enmeshed by the gear 20 of the clock 21, said pinion being interposed between the gear 20 and a gear 37, driving the latter. The gear 37 carries a pinion 38 whose teeth enmesh those of the internal ring gear 19, driving the same at a rate of one revolution each twenty-four hours.

The minute disc 35, on whose edge is imprinted graduations divided into minute intervals from one to fifteen and makes one revolution every fifteen minutes. The dial has a protuberance 39 on its periphery which is brought into engagement with a switch 40 at quarter hour intervals. The leads 41 (Fig. 6) from this switch are connected with the radio set R, suspended from the top 11 within the cabinet, thus allowing a program change every fifteen minutes. The operator may determine the duration or time lapse of a program by observing the edge of the dial 35, a portion of which protrudes through a slot in the base 10, as does the edge of the calendar dial 34 (Figs. 1, 2 and 6).

Returning to the circuit energizing column 31, it will be observed in Figure 5 particularly that this element consists of a core of non-metallic substance with which to insulate a cylindrical jacket 42 embracing the same from other ferrous parts, since the jacket 42 has formed thereon a spiral series of seven tubular protrusions 43 each of which is brought into operative influence at predetermined intervals with corresponding sets of seven contacts 28, any one of which may be depressed by a clip 27 on a post 24 to preselect a station program.

Figures 6, 7, 8, 9:
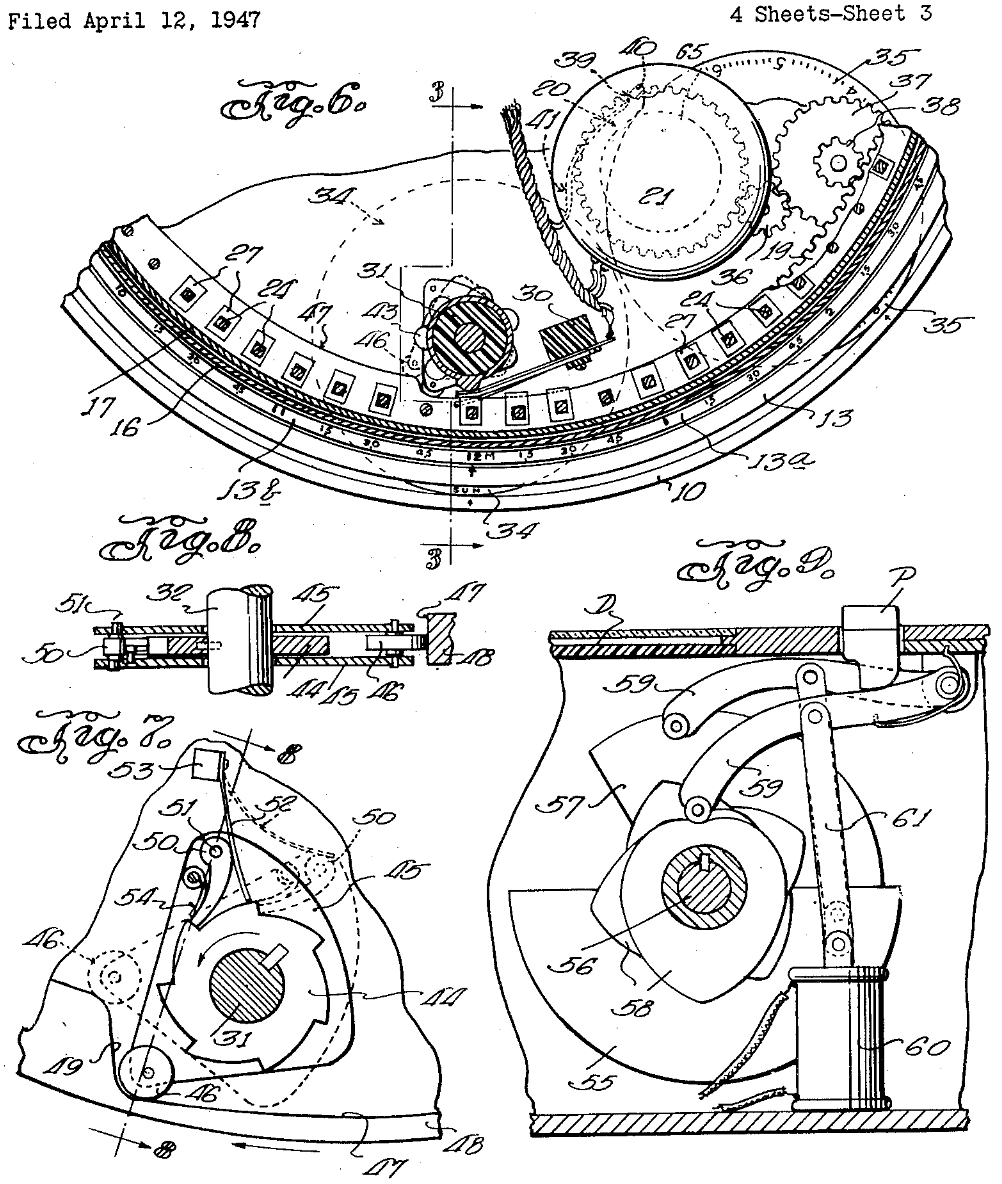
Figure 6 is a fragmentary plan view in transverse section showing the relationship of the selector posts, circuit energizing column, clock drive and associated elements.
Figure 7 is a fragmentary plan view of a twenty-four hour cam showing the cam and ratchet mechanism for imparting periodic rotation to the circuit energizing column.
Figure 8 is an elevational view, partly in section, taken on line 8—8 on Figure 7.
Figure 9 is an elevational view, partly in vertical section, showing a conventional tuning condenser and an operating solenoid forming part of the invention.

By referring to Figures 7 and 8, the manner in which the column 31 is periodically moved in a rotary fashion, may be determined. The object, of course, is to bring the lobular protrusions 43 thereon successively into operative relationship with the groups of contacts 28. The column 31 has keyed to its lower end 32 a ratchet wheel 44, below which is a dual plate cam 45 of substantially triangular shape. On one lobe or between the plates of the cam 45 there is mounted a roller 46 which bears against a track 47 of a large circular cam 48, equal in diameter to the internal ring gear 19, although the track 47 thereof diverges gradually inward, terminating in an abrupt drop 49. When the roller 46 rolls off the drop 49 a dog 50, pivoted at 51 to another lobe of cam 45 and which has assumed the position shown in dotted lines in Figure 7, propels the ratchet wheel 44 to another position, thereby rotating the column 31 a degree sufficient to bring into operative relationship with the column of switches 28, another of its lobular protrusions 43 for the purpose previously set forth. As a propelling agent for the cam 45, a leaf spring 52, anchored to a block 53, bears against the dog 50 and is augmented by a similar but shorter spring 54 which exerts a force against the concave face of the dog 50 to insure seating thereof subsequent to each successive displacement of the ratchet wheel 44.

In Figure 9 is shown the conventional condenser of a standard radio receiving set, which consists of the stator plates 55, rigidly affixed to the frame of the condenser and the rotor plates 57 are affixed to shaft 56. Also mounted on shaft 56 are five cams 58 which, through contact with arms 59, can be operated by station selector buttons P (Figs. 2 and 9) or in turn when the selector system is under automatic control and operated by solenoids 60 which actuate links 61, joining the solenoids to arms 59. These arms, coming selectively into engagement with cams 58 turn the rotors 57 to the position necessary to bring in the desired broadcasting station. Comparison of the disclosure in Figure 9 with the diagrammatic layout in Figure 10 will reveal the function of the solenoids 60.

Figure 10:
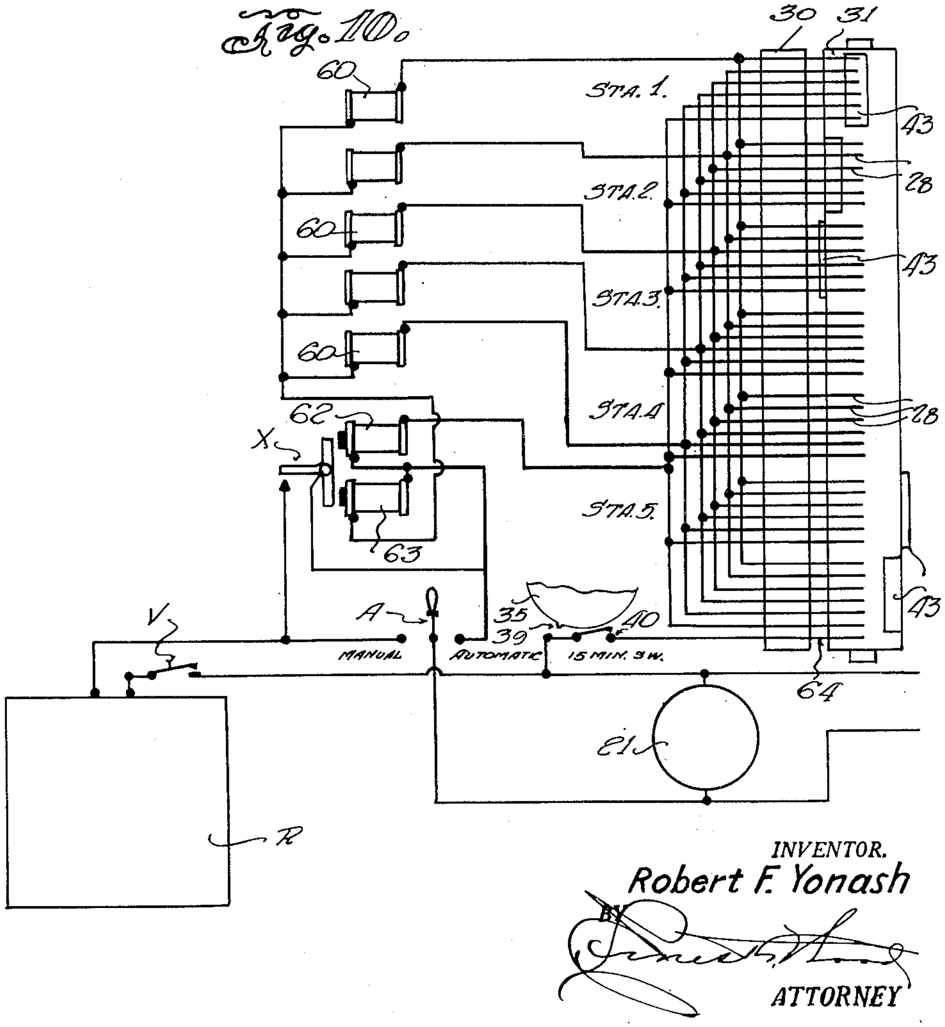
Figure 10 is a view illustrating diagrammatically or schematically a circuit suitable for the selector system of the invention.

In Figure 2, the tuning dial D and push button selectors carrying station call letters are typical of conventional sets with the exception that a knob A is added, which knob serves to put into or suspend operation the automatic control through the medium of switch X (Fig. 10).

The numbers adjacent to the station call letters appearing on the push buttons P in Figure 2 are identical to those on the vertically aligned panels on the selector posts 24. The off and on switch knob V also serves as a volume control as in some conventional receiving sets. Moreover, a tone control knob T is provided as is likewise a tuning knob M.

In the following description of operation, an example will be used wherein the selector system will be set to bring in one program, it being understood that all other settings are but repetitions.

First, the knob V is turned to "on" to volume desired. Assuming that Figure 4 illustrates the post indicated by the arrow—in Figure 6 and that station WRR (Fig. 2) broadcasts a desired program on Monday from 12:00 to 12:15 A. M., the clip 27 applying to "Monday" on the post 24, indicated as 12M by the calibrations on the lower annular flange 13b, is adjusted to position shown in Figure 4.

Assuming further that all other clips 27 have been left on the "O" position on the posts 24 and that knob A is turned to the automatic position, station WRR will be tuned in from 12:00 to 12:15 A. M. on each Monday and until time as additional selections are made or until the circuit is switched by knob A to the manual position, the radio set will remain off except for this fifteen minute period.

Referring to Figure 10, it will be noted that in order to complete the electrical circuit through one of the radio set tuning solenoids 60 and/or the automatic on and off switch X and solenoids 62 or 63, the following conditions must simultaneously exist:

Switch A must be set to automatic position.

The fifteen minute switch 40 must be closed by the protuberance 39. This switch accurately controls the timing and duration of the electrical impulse that is to operate the appropriate solenoids 60 and 63 or 62.

The circuit energizing column 31 will be indexed to its proper position by the cam track 47 and the roller 46 as explained. Thus the appropriate protuberance 43 will be in position to be contacted by the appropriate depressed contact 28. Thus only those contacts applicable to the day of the week indicated by the dial 34 will be able to make contact with a protuberance 43 of the column 31.

The hour of the day is determined by what post 24 is in position to depress a contact 28 into contact with the protuberances 43 on column 31.

The hour of the day and the day of the week having been determined. The operator has only to adjust the clips 27 on the panels 26 of the posts 24 indicating the stations desired at any particular time or to the "O" position if no desirable program is available on any of the stations under automatic control.

To turn on the radio set and tune in a station, the electrical impulse will flow as follows: From the power source through the fifteen minute switch 40; through the brush contact 64 up the metal jacket 42 out the protuberance 43 exposed to the depressed contact 28 to the applicable solenoid 60, tuning the set, through the solenoid 63 turning on the radio set through the switch "A" and returning to the power source.

To turn the radio set off, the current flows the same as above except after reaching the contact 28 behind the "O" position on the post 24, it flows to the solenoid 62 and turns the radio set off.

The duration of the selected program is determined by the time graduations 13b on the exposed edge of the flange 13a and corresponding pointer on the base 10 (Fig. 1). The typical fifteen minute program starting at twelve o'clock mid-day would, of course, close at 12:15. Therefore, in order to open the radio circuit at the close of the program, the clip 27 on a post opposite "12:15" on the scale 13b is set at "O" thereon, hence the circuit is broken at the next succeeding depressed by the latter clip comes into engagement with the lobe of the column 31.

There are ninety-six posts 24 representing fifteen minute divisions of a twenty-four hour period, thus producing for all radio programs having a minimum duration of fifteen minutes.

In Figure 3 is shown a friction clutch plate 65, affixed to the clock shaft and against which the gear 20 frictionally bears under the pressure of a spring 66. The gear 20 is freely mounted on the shaft, hence it may be turned in either direction to cause the intermediate pinion 36 (Fig. 6) to revolve, thereby rotating the ring gear 19 for day and hour setting of the assembly, either directly or by means of the minute dial 35. Broadly, the clutch provides that the clock may be released from the selector system in order that all time factors may be correspondingly adjusted in setting the system for preselection of programs.

It will be understood that any suitable form of circuit may be employed in substitution to that shown in Figure 10 and that it is not intended that the invention be restricted to the specific form of mechanism for actuating the circuit energizing column 31. Moreover, other changes and modifications may be made without departing from the spirit and intent of the invention so long as such variations are construed in the light of the following claims.

What is claimed is:

1. A radio program selector system including in combination with a radio receiving set, a stationary base, a rotatable mounting on said base, a circular series of posts vertically disposed on said rotatable mounting and relatively spaced at predetermined intervals, each of said posts being divided into vertically spaced groups of panels indicative of the days of a week and of preselected radio broadcasting stations, a radio circuit having leads common to selected panels of said posts, a depressible contact on each of said leads, a plurality of means adjustable vertically on each of said posts within the range of said groups of panels indicative of radio broadcasting stations and adapted to selectively depress said contacts, clock controlled means for rotating said post mounting at a predetermined rate of speed, a multi-lobed cam shaft rising from said stationary base whose lobes are spaced spirally on said shaft from one end to the other and coordinating with said depressed contacts to energize the radio circuit lead selected by said vertically adjustable means to said radio receiving set and means for imparting rotary motion to said cam shaft at predetermined intervals during the rotative cycle of said post mounting.

2. In an automatic program selector for radio receiving sets, a stationary base, a rotatable member on said base, an assembly of circularly spaced posts disposed vertically on said rotatable member, each having vertically spaced panels bearing indicia indicative of days of the week and identifying media of preselected radio broadcasting stations, clock mechanism for actuating said rotatable member and causing said posts to successively pass a given point at predetermined intervals, a radio circuit having a plurality of leads, a depressible contact carried by each of said leads, one of which is in juxtaposition to the path of each panel of said posts at said given point of passage, a plurality of clips adjustable vertically on each of said posts for selectively depressing said contacts, a rotatable cam shaft having spirally spaced lobes thereon from top to bottom, said lobes coordinating with said depressed contacts to energize said radio circuit to audition a selected program, means for actuating said cam shaft at predetermined intervals during operation of said post assembly and means for predetermining the duration of said program.

3. In an automatic program selector for a radio receiving set, a stationary base and a member rotatable on said base, a radio circuit having a plurality of leads, each carrying a contact, said contacts being grouped in a plane perpendicular to said rotatable member, a plurality of station selector posts vertically disposed and circularly spaced on said mounting, each having longitudinally spaced panels indicative of the days of the week, clock mechanism for rotating said mounting and causing said posts to move successively into juxtaposition with said group of contacts, means adjustable on said posts for selectively engaging said contacts, a shaft mounted on and perpendicular to said base having spirally spaced lobes arranged longitudinally thereon to render said contacts effective to energize said radio circuit to preselect programs to be auditioned by said radio receiving set, means for imparting periodic rotary movements to said shaft and means to predetermine the duration of said program.

4. An automatic program selector system for a radio receiving set including a stationary base, a rotatable member on said base, a radio circuit having a plurality of leads, a contact for each of said leads, said contacts being arranged in perpendicular alignment with said base, a circular series of posts vertically disposed on said rotatable member having longitudinally spaced panels designated with days of the week, a plurality of individually adjustable clips on each of said posts for selectively engaging said contacts, clock controlled means for actuating said rotatable member, a rotatable column perpendicular to said base, having a spiral series of lobes spaced longitudinally thereon and periodically actuated by said clock controlled means for rendering the engaged contacts effective to energize said radio circuit to audition a program preselected by said contact engaging means and means for predetermining the duration of said auditioned program.

5. An automatic radio program selector including a stationary circular base and a stationary top of corresponding shape having a radio receiving set suspended from its underside, a rotatable member on said base, a circular series of posts arranged perpendicularly on said rotatable member intermediate said top and base, a radio circuit, a plurality of contacts, clock operated means for moving said rotary member to advance said posts successively into juxtaposition with said contacts, a group of longitudinal panels indicative of the days of the week and of preselected radio broadcasting stations on each of said posts, adjustable clips on each of said posts adapted to be set as determined by said station designations and effective to displace said contacts selectively, a rotatable column having a spiral series of lobes cooperating with said clips to close said selected contacts to energize said radio circuit to audition a program preselected by said adjustable clips and means for predetermining the duration of energization of said radio circuit.

6. In an automatic program selector for a radio receiving set, a radio circuit having a plurality of contacts, a stationary base, a rotary, clock controlled member on said base, a circular series of posts vertically disposed on said rotary member, each having longitudinally spaced panels thereon designated with days of the week, spring clips frictionally engageable with said posts and longitudinally adjustable thereon and equal in number on each post to the days of the week, said clips being effective to selectively engage the contacts of said radio circuit to preselect programs to be auditioned by said radio set, a column parallel with said posts having a spiral series of longitudinally spaced lobes thereon periodically effective to render the engaged contacts operative to energize said radio circuit and means for predetermining the duration of the auditioned program.

ROBERT F. YONASH.

REFERENCES CITED

The following references are of record in the file of this patent:

UNITED STATES PATENTS

| Number | Name | Date |
|---|---|---|
| 1,091,486 | Cutler | Mar. 31, 1914 |
| 1,772,786 | Sokoloff | Aug. 12, 1930 |
| 1,948,672 | Purdy | Feb. 27, 1934 |
| 2,061,504 | Christie | Nov. 17, 1936 |
| 2,072,897 | Marschalk | Mar. 9, 1937 |
| 2,096,072 | Spagnola | Oct. 19, 1937 |
| 2,215,842 | Thomsen | Sept. 24, 1940 |